United States Patent [19]

Torpey

[11] Patent Number: 5,021,166
[45] Date of Patent: Jun. 4, 1991

[54] METHOD AND AN APPARATUS FOR EXTRACTING A LIQUID FROM A SLUDGE

[76] Inventor: Patrick Torpey, 26 Hyde Road, Dalkey, County Dublin, Ireland

[21] Appl. No.: 413,719

[22] Filed: Sep. 28, 1989

[30] Foreign Application Priority Data

Sep. 30, 1988 [GB] United Kingdom ................ 2986/88

[51] Int. Cl.[5] ................ B01D 21/01; B01D 29/82; B01D 33/04
[52] U.S. Cl. .................. 210/709; 210/733; 210/737; 210/745; 210/770; 210/781; 210/787; 210/800; 210/806; 210/85; 210/96.1; 210/143; 210/198.1; 210/216; 210/360.1; 210/400; 494/37; 100/35; 100/152
[58] Field of Search .............. 210/709, 733, 737, 745, 210/770, 781, 800, 806, 85, 96.1, 143, 198.1, 216, 400, 787, 360.1; 494/37; 100/35, 151, 152

[56] References Cited

U.S. PATENT DOCUMENTS

| 4,192,743 | 3/1980 | Bastgen et al. | 210/770 |
| 4,330,411 | 5/1982 | Florin et al. | 210/771 |
| 4,358,381 | 11/1982 | Takeuchi et al. | 210/770 |
| 4,402,834 | 9/1983 | Bastgen et al. | 210/770 |
| 4,836,100 | 6/1989 | Johnson | 210/400 |
| 4,867,886 | 9/1989 | Botkins, Jr. | 210/745 |

FOREIGN PATENT DOCUMENTS

| 63-256107 | 10/1988 | Japan | 210/745 |
| 63-256108 | 10/1988 | Japan | 210/745 |
| 63-278508 | 11/1988 | Japan | 210/745 |

Primary Examiner—W. Gary Jones
Attorney, Agent, or Firm—Birch, Stewart, Kolasch & Birch

[57] ABSTRACT

An apparatus for extracting liquid from a sludge/conditioning agent mixture which comprises a first endless belt (10) of filter material; a second endless belt (12) of filter material; and rollers (20, 21, 22, 23, 24, 25, 26, 27, 13, 14, 15) for the belts (10, 12). That part of the belt (10) between the rollers (20, 23) is defined as a gravity dewatering zone; the part of the belts (10, 12) between the rollers (21, 13, 14, 15) is defined as a pressure de-watering zone. Filtrate is collected in a tray (17); liquid is collected in a tray (35). Monitoring means monitors a characteristic of the filtrate and the liquid to enable a rate of change in the characteristic of the filtrate/liquid to be determined. The apparatus functions at its optimum at a loading rate for the mixture which is just less than that which causes extrusion of the liquid in the pressure de-watering zone.

13 Claims, 7 Drawing Sheets

METHOD AND AN APPARATUS FOR EXTRACTING A LIQUID FROM A SLUDGE

The present invention relates to a method and an apparatus for extracting liquid from a sludge. In particular, it relates to a method and an apparatus for separating the liquid component of suspensions or sludges, and more particularly to a method and an apparatus in which the liquid component is extracted from such solid materials as fibres, colloids, and the like, as the suspension or sludge is deposited onto a moving perforate conveyor belt which acts as a filter.

The present invention also relates to a method and apparatus for the separation of liquid suspension by means of a centrifugal separator.

An apparatus of this type is particularly useful in connection with the treatment of sewage sludge. However, the apparatus may also find application in the paper making industry or in the chemical industry, where the liquid component of a suspension or sludge preparation is to be removed in a continuous operation. The invention can also be applied to a method and an apparatus for separating the liquid component from suspensions of sludges, using vacuum filters and centrifugal separators.

The treatment of sewage sludge has evolved from the previously purely physical separation of its liquid and solid components to prior chemical treatment of the sludge with various conditioning agents such as the colloid producing polyacrylamides. This treatment results in a precipitation effect which is similar to the transformation of milk when it turns sour thus permitting the separation of the water component from the now colloidal sewage.

Central to the process is a mechanical filtration device such as a centrifuge vacuum filter or belt filter press. A conditioning agent is added to a stream of sludge in order to promote the agglomeration of the colloidal particles in the sludge. In the case of the vacuum filter or belt filter press, the size of the agglomerated particle is sufficiently large as to prevent it passing through a perforate filtration medium. In the case of the centrifuge, which does not employ a perforate filtration medium, the addition of the conditioning agent assists in the separation of the liquid component under the enhanced gravitational forces applied by the centrifugation process.

In conventional filtering or mechanical dewatering process input streams are (i) a sludge stream which comprises suspensions of fibres, colloids and the like, and (ii) a conditioning agent stream comprising an organic or inorganic material, liquid or solid which, when added to the sludge stream promotes precipitation and or agglomeration of the fine suspensions. Optionally, a washwater stream may be required in certain mechanical dewatering devices to clean the perforate medium and to prevent plugging of the perforations.

It is known that a relationship can be established between a characteristic of the sludge stream, principally the nature and/or the quantity of suspended matter in the liquid carrying medium, and the quantity of (various possible) conditioning agents which may be used to make effective the separation process. The results of the process are a concentrated sludge stream and wastewater.

Further, it is known that adjusting the proportion of conditioning agent added to the sludge stream will affect the efficiency of the dewatering process, as measured both by the percentage of total solids contained in the sludge stream which are removed in the concentrated sludge stream, (known as the solids recovery efficiency), and also the proportion of solid matter in the concentrated sludge stream (known as the dewatering sludge "solids content", typically expressed as "percent dry solids").

It is known that the proportions of conditioning agent and sludge can be controlled in such a manner as to maintain a proportionate relationship between the amount of conditioning agent and the volume and/or solids content of the sludge stream.

It is further known that devices can be used to detect the amount of solid matter lost, or passing through, the perforate filtration medium and that this information can, in theory, be used in order to adjust, for example, the volume of conditioning agent added so that any desired degree of clarity may be achieved in the liquid filtrate passing through the perforate filtration medium.

Known control systems which depend on detecting changes in filtrate turbidity do not allow for the fact that turbidity changes can occur for a number of reasons. For example, the characteristics of the feed sludge vary constantly with time. This is particularly the case with aerobic sludges. Pockets of septic sludge can be dislodged from supply tanks. The efficiency of the filter belt cleaning system can vary, possibly as a result of varying water pressure. Clumps of sludge, which build up in the collecting trays in the course of normal operation, can become dislodged and 'contaminate' the filtrate liquid. All these normal variations in operating conditions lead to significant 'local' variations in the filtrate turbidity reading.

The disadvantage of such control systems include a dependance on the accuracy and repeatability of the devices used to measure the clarity, turbidity or solids content of the filtrate. The control devices operate by taking discrete measurements the results of which are used to calibrate the filtration device at start-up. Subsequent measurements are taken at relatively long intervals and further adjustments are made. In practice, the filtration device is calibrated to allow for the least favourable working conditions which might occur, if at all, for relatively short periods of time. Consequently, not only is there a considerable unnecessary waste of conditioning agent, but the throughput of the filtration device is significantly reduced.

It is an object of the present invention to overcome these problems.

It is a further object of the present invention to (1) minimize the amount of chemicals (usually polymers) used in the method
(2) Maximize the throughput
(3) Maximize the cake solids
(4) Minimize the labor content.

Merely taking one of these objectives separately may not be sufficient if the other objectives are not taken into consideration.

The invention, therefore, provides a method for extracting liquid sludge which method comprises the steps of feeding a agent to the sludge to form a mixture;
feeding the to a separation means for enabling a significant proportion of the liquid, known as the resulting liquid, to be removed therefrom;

continuously or continuously measuring a characteristic of the resulting liquid so as to produce a first input signal;

continuously or continuously monitoring and analyzing the input signal in an analyzer means so as to determine a first empirical rate of change of the characteristic;

outputting from the analyzer means a first output signal related to the input signal which first output signal serves to control the rate of flow of the mixture through the separation means;

creating an over condition wherein the mixture flows from the means into the resulting liquid thereby producing liquid;

continuously or continuously monitoring the characteristic of contaminated liquid so as to produce a second input signal;

continuously or substantially continuously monitoring and analyzing the second input signal in the analyzer means so as to determine a second empirical rate of change of the characteristic;

determining a transition point between the first rate of change and the second rate of change; which transition point is the upper limit of said first rate of change; and subsequently maintaining the flow of the mixture so that the value of the characteristic is maintained near but not at said upper limit.

The invention further provides an apparatus for extracting liquid from a sludge which apparatus comprises means for adding a conditioning agent to the sludge to form a mixture; means for feeding the mixture to a separation means for enabling a significant proportion of the liquid, known as the resulting liquid, to be removed therefrom; means for collecting and/or disposing of the resulting liquid; means for collecting and/or disposing of the resulting de-watered mixture; means for continuously or substantially continuously measuring a characteristic of the resulting liquid so as to produce an input signal; analyzer means for continuously or substantially continuously monitoring and analyzing the input signal so as to determine empirical rates of change of the characteristic; said analyzer means being capable of outputting an output signal related to said input signal which output signal serves to control the rate of flow of the mixture through the filtration means.

The invention further provides an apparatus for extracting liquid from a sludge which apparatus comprises a first endless belt of filter material; a second endless belt of filter material; means for feeding a mixture of sludge and a conditioning agent on to the first endless belt; a first set of roller means; the first endless belt being mounted on the first set of roller means which define a path of travel for the first belt; the first belt having an upper run which, in use, is at least approximately horizontal and which has an exposed surface defining a gravity de-watering zone; the second endless belt being disposed substantially below the first belt; a second set of roller means; the second endless belt being mounted on the second set of roller means which define a path of travel for the second endless belt; some of the rollers of the first set of rollers and some of the rollers of the second set of rollers each being one and the same and define a common set of rollers whereby the first belt and the second belt travel along a common path around the common set of rollers being biased together by belt tension forces to define a pressure de-watering zone; said gravity de-watering zone being upstream of said pressure de-watering zone; a first means for collecting filtrate from the gravity de-watering zone; a second means for collecting extruded liquid from the pressure de-watering zone; means for continuously or substantially continuously monitoring a characteristic of the filtrate so as to produce a first input signal; means for continously or substantially continuously monitoring a characteristic of the extruded liquid so as to produce a second input signal; analyzer means for continuously or substantially continuously monitoring and analyzing the input signals so as to determine empirical rates of change of the characteristics; said analyzer means being capable of outputting an output signal related to said input signals which output signal serves to control the rate of flow of the mixture through the apparatus.

The invention will be understood in greater detail from the following description of preferred embodiments thereof given by way of example only and with reference to the accompanying drawings in which.

Figure 1:
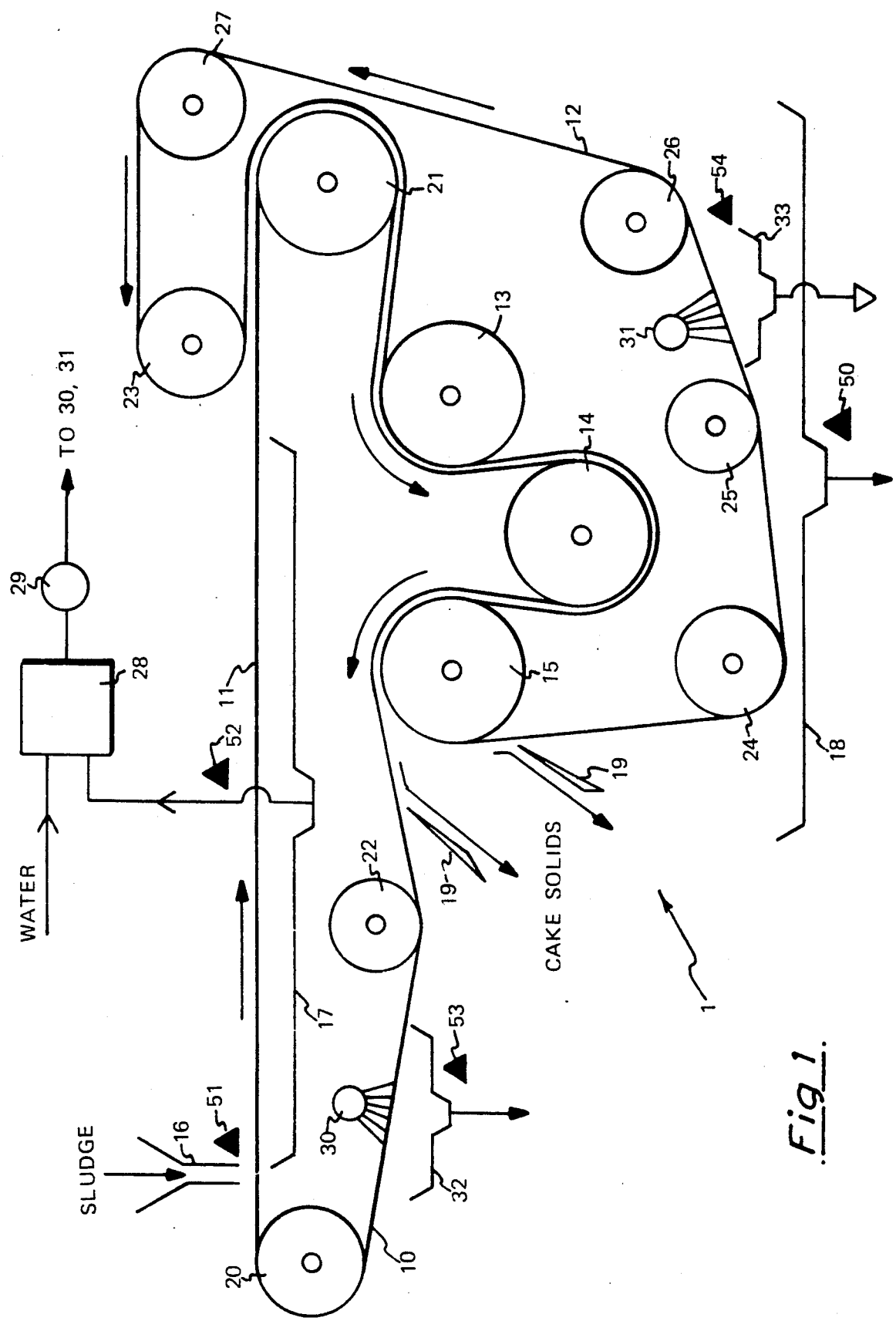
FIG. 1 is a schematic diagram of a first embodiment of an apparatus according to the invention.

Referring now to the drawings and in particular to FIG. 1, there is shown an apparatus 1 according to the invention for extracting liquid from a sludge which apparatus comprises a first endless belt 10 of filter material; a second endless belt 12 of filter material; a first input or feed means 16 for feeding sludge onto the first belt 10; a second input or feed means (not shown) for feeding a conditioning agent to the sludge to form a mixture; a first means 50 for monitoring a characteristic of the filtrate from the apparatus 1; and an analyzing means (not shown).

The first endless belt 10 is mounted under tension on a first set of rollers 20, 21, 13, 14, 15 and 22 which define a path of travel for the first belt 10. Between the end rollers 20 and 21, the belt 10 has an upper run 11 which is at least approximately horizontal and which has an exposed upper surface defining a gravity de-watering zone.

The second endless belt 12 is disposed substantially below the first belt 10 and is mounted under tension on a second set of rollers 23, 21, 13, 14, 15, 25, 26 and 27 which define a path of travel for the second belt 12. In each case the filter belt 10, 12 is preferably of monofilament polyester yarn.

It will be noted that the rollers 21, 13, 14 and 15, which are of substantially larger diameter than the other rollers of the apparatus, are common to each set of belt-supporting rollers whereby the two belts 10 and 12 travel partially along a common path around these rollers wherein they are pressed together by belt tension forces to define a pressure de-watering zone. It will be appreciated the rollers 21, 13, 14 and 15 may, if desired, have the same diameter.

The first feed means 16, which incorporates a variable output pump (not shown), feeds sludge onto the exposed surface of the upper run 11 of the first belt 10 adjacent the upstream end of the run 11 near the end roller 20. The sludge supplied to the feed means 16 may be pre-conditioned with a polyelectrolyte such as polyacrylamide to cause super-flocculation, the feed means 16 being designed in a known manner to feed the conditioned sludge to the belt 10 in a manner which ensures an even feed over the belt surface without damaging the flocs. It will be appreciated that any suitable conditioning aid as is well known may be used to cause flocculation.

As already indicated above, the conditioning agent is fed to the sludge by means of a dosing pump. It is preferable to add the conditioning agent to the sludge prior to the sludge entering the first feed means 16. However, it will be appreciated that the conditioning agent may be added to the sludge following deposition of the sludge onto the first endless belt 10.

The sludge fed onto the upper run 11 of the belt 10 is carried downstream through the gravity de-watering zone where the polyester filter belt 10 allows water or filtrate to drain freely into a collection tray 17. At the downstream end of the run 11 the partially de-watered sludge enters between the two belts 10 and 12 for passage along the common path through the pressure-watering zone. The partially de-watered sludge enters between the two belts while still on the upper run 11 of the first belt 10, which is achieved by bringing a portion of the second belt 12, on the rollers 23 and 27, around the downstream end of the upper run 11 of the belt 10 so as to lie directly above the latter. By this means the sludge is trapped between the belts before reaching the main pressure de-watering zone defined by the large diameter rollers 21, 13, 14 and 15.

The water squeezed from the sludge in the pressure de-watering zone may be collected in a second tray 18. Finally, after passage around the rollers 21, 13, 14 and 15, the de-watered sludge is scraped as a solid or semi-solid cake from the belts by nylon scrapers 19 for disposal in any suitable manner.

The filtrate collected in the tray 17 under the gravity de-watering zone may be sufficiently free from contamination to be used for belt washing and can, therefore, be collected in a tank 28 for feeding by a wash pump 29 to wash bars 30 and 31. This reduces the overall water consumption for belt washing purposes. Alternatively, the filtrate collected in tray 17 may be disposed of separately. Individual collection trays may be fitted under each of the wash bars 30 and 31 and the liquid from these as well as the liquid from the tray can be disposed of separately.

In many cases the liquids from trays 17, 18, 32, and 33 may be combined together to form the total liquid effluent from the de-watering process.

Figure 2:
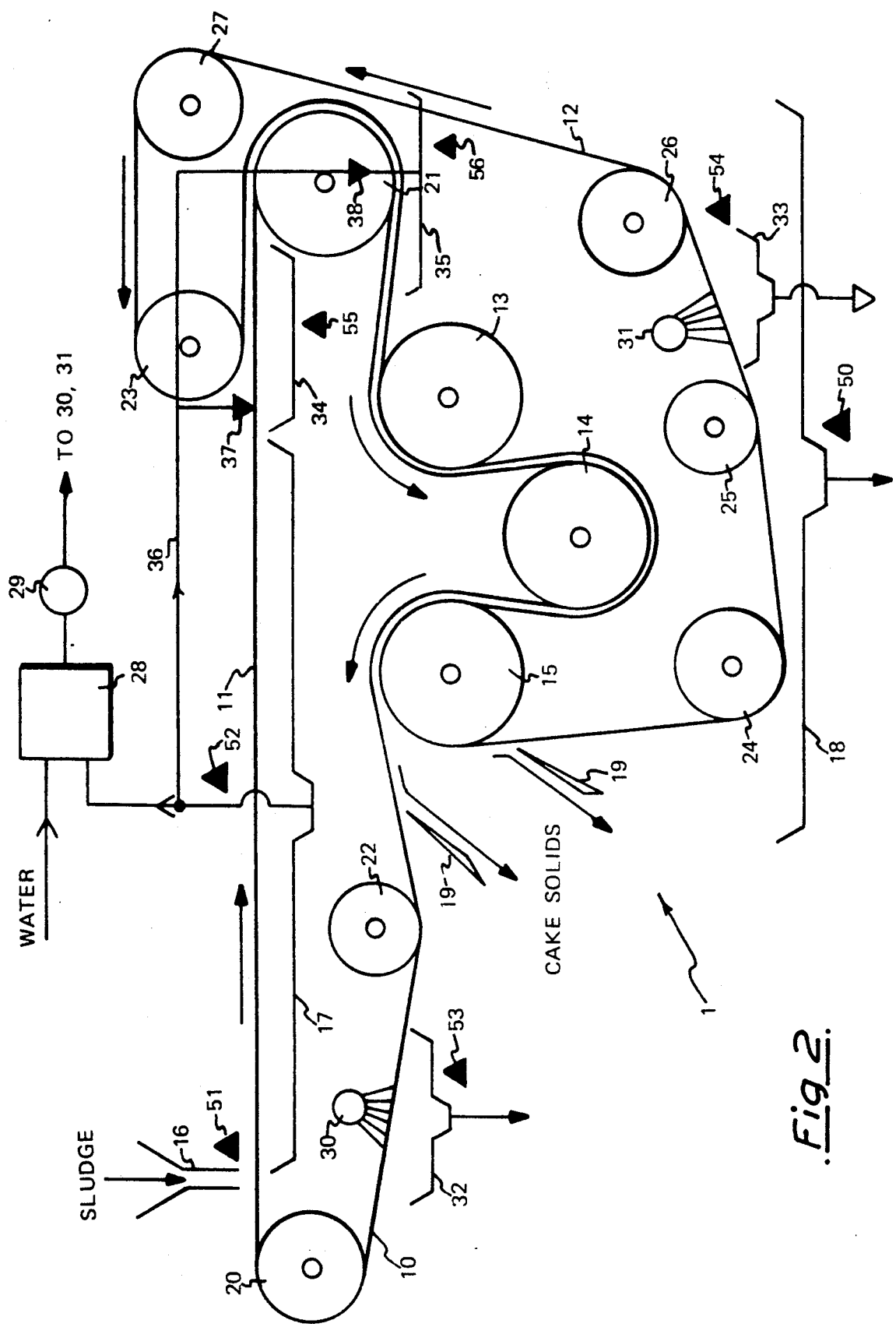
FIG. 2 is a schematic diagram of a second embodiment of an apparatus according to the invention.

With particular reference to FIG. 2 of the drawings, there is shown an apparatus 1a according to the invention which is substantially similar in all respects to the apparatus shown and described with respect of FIG. 1 of the drawings. However, in the apparatus of FIG. 1a, additional collection trays 34 and 35 are provided. The tray 34 is located below that of the upper run 11 of the first belt 10 where that portion of the belt 12 located between the roller 23 and 27 is directly above said upper portion.

The tray 35 is located in that portion of the apparatus i.e. below and between the roller 21 and 13.

Flushing water, derived from the mains water supply (not shown) or from the belt washing system, may be provided and discharged through suitable nozzles (represented by the line 36 and the arrows 37, 38 respectively.

A major objective of the process is to minimize the quantity of solids matter (which was originally contained in the sludge stream) from entering the trays 17, 18, 32, and 33, 34 or 35.

In operation the rate of flow of sludge and the amount of conditioning agent added to it are adjusted manually so as to cover typically but not essentially 80 to 85 percent of the belt surface. If the feed rate should become excessive, the sludge will squeeze out sideways from the "sandwich" formed by the two belts 10, 21 as they pass over the rollers and this extruded sludge will normally fall into the tray 18, thus causing the solids level (% of solid matter) in the total liquid effluent to rise dramatically. In FIG. 2 of the drawings, this extruded sludge will also fall into the trays 34, 35.

It will be appreciated that the rate of flow of the mixture through the apparatus depends not only on the setting of the pump but also on the ratio of sludge to conditioning agent in the mixture.

Heretofore, at that point when the concentration of solid matter in the total liquid effluent begins to rise rapidly, the apparatus can be considered as overloaded and the operator must take steps to reduce the loading either by reducing the sludge feed rate, or by adjusting the proportions of conditioning agent added, or both. The operator can also vary other parameters such as the velocity of the filter belts. It is characteristic of typical sludge streams, be they arising from the treatment of domestic or industrial wastes, that the fundamental characteristics governing their filterability are subject to constant change throughout the working day. As a consequence, constant attention to the process is required in order to achieve the maximum throughput in the process and to minimize the consumption of conditioning agent required by the process. The major portion of the operating cost of such a de-watering process is usually the consumption of conditioning agent and labor costs associated with the need to attend to the apparatus particularly with respect to the requirement to vary the sludge flow rate and/or the concentration of the conditioning agent.

In practice, heretofore, an operator adjusted the flow rate of sludge, the flow rate of conditioning agent and the velocity of the filter belt in such a way as to ensure that, if and when the characteristics of the sludge vary, there is sufficient capacity in the de-watering apparatus and sufficient conditioning agent available to meet the worst-case conditions without gross overspillage of sludge into the total liquid effluent. This inevitably meant an under-utilization of the capacity of the apparatus and an over-dosage of conditioning agent, both of which are economically disadvantageous.

In order to optimize the operation of the apparatus 1 or 1a, a first monitoring means 50 is provided. The first monitoring means 50 is located so as to monitor the filtrate from the pressure de-watering zone draining into the tray 18. In some systems, the filtrates from the gravity de-watering zone and the pressure de-watering zone are combined which combined filtrate may be monitored by appropriate location of the first monitoring means 50.

If desired a second monitoring means 51 may be employed so as to monitor the sludge stream falling on the upper run 11.

Further, if desired third, fourth and fifth monitoring means 52, 53 and 54 may be employed so as to monitor the filtrate from the gravity de-watering zone, the filtrate from tray 32 and the filtrate from tray 33 respectively. In FIG. 2 of the drawings, the apparatus 1a employs a sixth monitoring means 55 and a seventh monitoring means 56.

The monitoring devices 50-56 are of the type in which a beam of light at a suitable wavelength is passed through the relevant stream of liquid and the percent transmission of light detected by a respective detector means. The detector means outputs a respective electrical signal related to the strength of received light. It is not necessary to determine absolute levels but merely changes in levels of detected light. Essentially, therefore, relative changes in turbidity levels are monitored. Alternatively, relative changes in the solids content level could be monitored. In other words, the proportion of solid material in the resulting liquid could be monitored. It will be appreciated that the monitoring devices 50-56 may comprise IR, UV or visible light absorbing means. The devices 50-56 could comprise ultrasonic means or a nuclear density meter.

The respective signal from the monitoring means 50 or the means 51-56, if present, are fed to the analyzing means which, in response to the changes in detected light, outputs relevant signals to a variable speed pump (not shown) and/or to a dosing pump (not shown). The variable speed pump controls the flow of the sludge falling on the upper run 11; the dosing pump controls the volume of conditioning agent added to the sludge stream.

The analyzing means or process control system will preferably comprise a computer means controlled by suitable software.

Initially, the apparatus is run so that the loading rate of the sludge stream onto the belt 11 is relatively low and turbidity levels are measured and stored.

Figure 6:
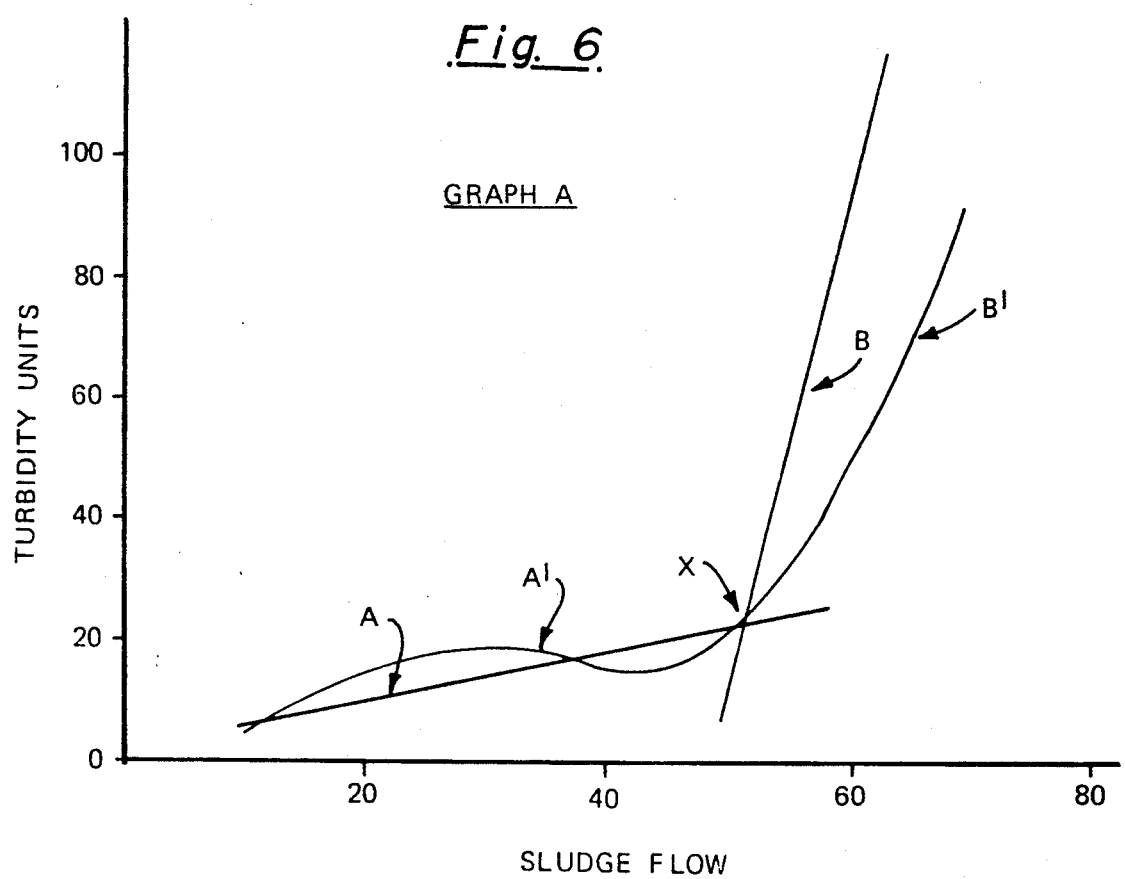
FIG. 6 shows Graph A which illustrates turbidity units versus sludge flow.

The rate of flow of the sludge stream is increased and the turbidity levels are analyzed and stored. For a particular installation, a loading rate will be reached which will cause an over-load or overflow of the sludge stream into the tray 18 (initially trays 34 and 35 of the apparatus of FIG. 2). This overflow will produce a sudden and dramatic change in the turbidity of the filtrate falling into the tray 18 (or trays 34 or 35) which, of course, is detected by the monitoring means 50 (or 55 or 56). A typical graph showing readings obtained is shown in FIG. 6 on Graph A. The graph line A plots turbidity units, which are the combined readings obtained from the monitoring means 50, 52-56 (i.e. the filtrate entering trays 17, 18, 32, 33, 34 and 35) versus the sludge flow. The graph line A' plots a non-linear result obtained.

As the sludge flow increases, while still within the capacity of the apparatus 1 or 1a (as determined by zero spillage or sideways extrusion) the apparent filtrate turbidity increases more or less in proportion to the sludge flow (because the apparent turbidity, resulting from material washed from the filter belt by the action of the liquid from the wash bars 30, 31, 37 or 38, is proportional, in the main, to that proportion of the available belt width which is occupied by the influent sludge stream). This rate of increase is relatively slight, producing a response typified by line A (or A').

At some point X (referred to as a knee or transition point) the capacity of the apparatus 1, 1a, as defined above, is exceeded and spillage of influent sludge into tray 18 (or 34 or 35) occurs. The rate of increase of the apparent turbidity thereafter changes dramatically, producing line B (or line B') of steeper slope.

Thus the capacity limit of the apparatus 1 (or 1a) may be detected reliably and repeatedly by locating the point of intersection of lines A and B (or A' and B'). The process control system may then be set to operate continuously at some proportion of the corresponding sludge flow rate, typically say 90% or so of this 'maximum' rate. It will be appreciated that any proportion other than 90% may be chosen, for example 85% to 95%.

It will also be appreciated that the process control system takes measurements at various sludge flow rates sufficient to define two distinct lines A and B (or A' and B') but that there is no requirement for knowing exactly the relationship between the level of solids in the filtrate and the apparent turbidity measurement.

In order to react rapidly to the onset of a transition point x (knee) or overload condition, and so that the period of time for which the apparatus 1 or 1a operates in overload is minimized, it is desirable to ensure that the excess material is conveyed as rapidly as possible to the final filtrate measurement point.

To achieve this, the additional trays 34, 35 are provided (FIG. 2). The material entering the trays 35, 34 can be rapidly measured. The latter may be achieved by provided flushing water to convey the excess material.

Extrusion or spillage is most likely to occur at the end of the gravity drainage section of the machine, where the horizontal run 11 of the belt meets the second belt at roller 23. Another suitable location for capturing the spillage is the zone between roller 23 and the exit point from the roller 21 (i.e. the tangent from rollers 21 to 13).

Accordingly, the process control system operates in a dynamic fashion by repeatedly seeking to re-defining fine lines A and B (or A' and B'). The process control system can re-define a new operating or transition point x to correspond to any change which may have taken place in the filterability, or solids content, of the influent sludge stream.

Figure 7:
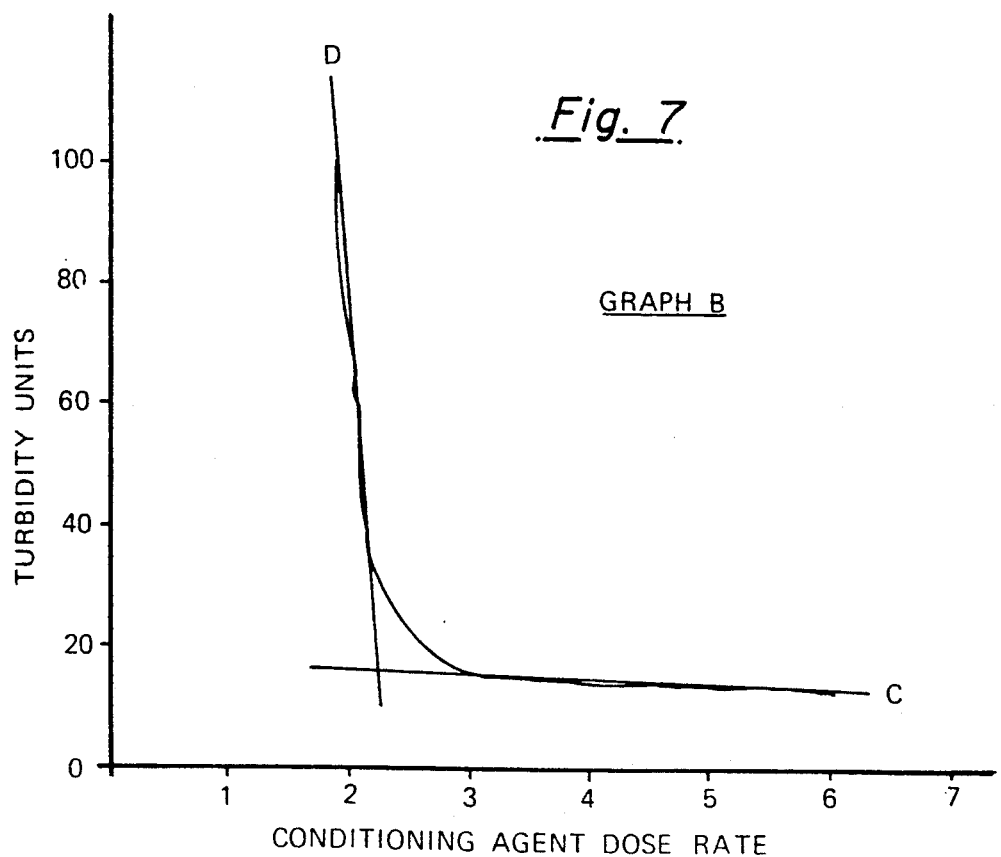
FIG. 7 shows Graph B which illustrates turbidity units versus conditioning agent dose rate.

Similarly, if the sludge stream flow rate is held constant and the conditioning agent flow rate is reduced, a dose ratio will be reached which will cause a loss of flocculation, resulting in a sudden and dramatic increase in the turbidity. A typical graph showing readings obtained is shown in FIG. 7 as Graph B. The graph plots turbidity units which are the combined readings obtained from the monitoring means 50, 52-54 versus the agent dose rate.

As the polymer flow rate is decreased (from a point at which flocculation was occurring) the filtrate turbidity increases very slowly and produces a response typified by line C. When flocculation is lost the turbidity increases rapidly and produces a line with a steeper slope. (line D)

Thus the minimum conditioning agent flow rate may be determined by finding the intersection of the lines C and D and operating at same percentage of this dose rate—e.g. 110%.

The use of monitoring means 51-56, although not essential, serve to enhance the capability of the analyzing means resulting in a relatively faster response time which results in further optimization of performance of the apparatus 1 or 1a.

By measuring the turbidity of the total liquid effluent from the apparatus 1a, which includes liquid from trays 17, 18, 32 and 33, problems can be detected other than those related only to the permeability of the filter medium, or to the degree of agglomeration/flocculation achieved by the polymer dosing. This is particularly the case when the 'knowledge base' of information (i.e. the stored data pertaining to previous operational experience) is used in interpreting the turbidity readings.

A further feature of the analyzing means is that it will continue to accumulate data pertaining to the process, such as the flowrates of the various streams, and will prompt an operator for further information so that a knowledge base or data-base of information relevant to that particular installation will be accumulated.

The information contained in this database will be used by the monitoring means to:
establish start-up conditions;
check instantaneous operating conditions against historical trends cross-check readings from instrumentation;
to identify possible faulty instruments;
to choose operating conditions (mainly polymer dose rate) which will favor one or more criteria established by the operator e.g. if the operator wants a drier cake, the database will be searched to find what proportional increase in dosage has historically tended to produce a drier cake, etc.

Figure 3:
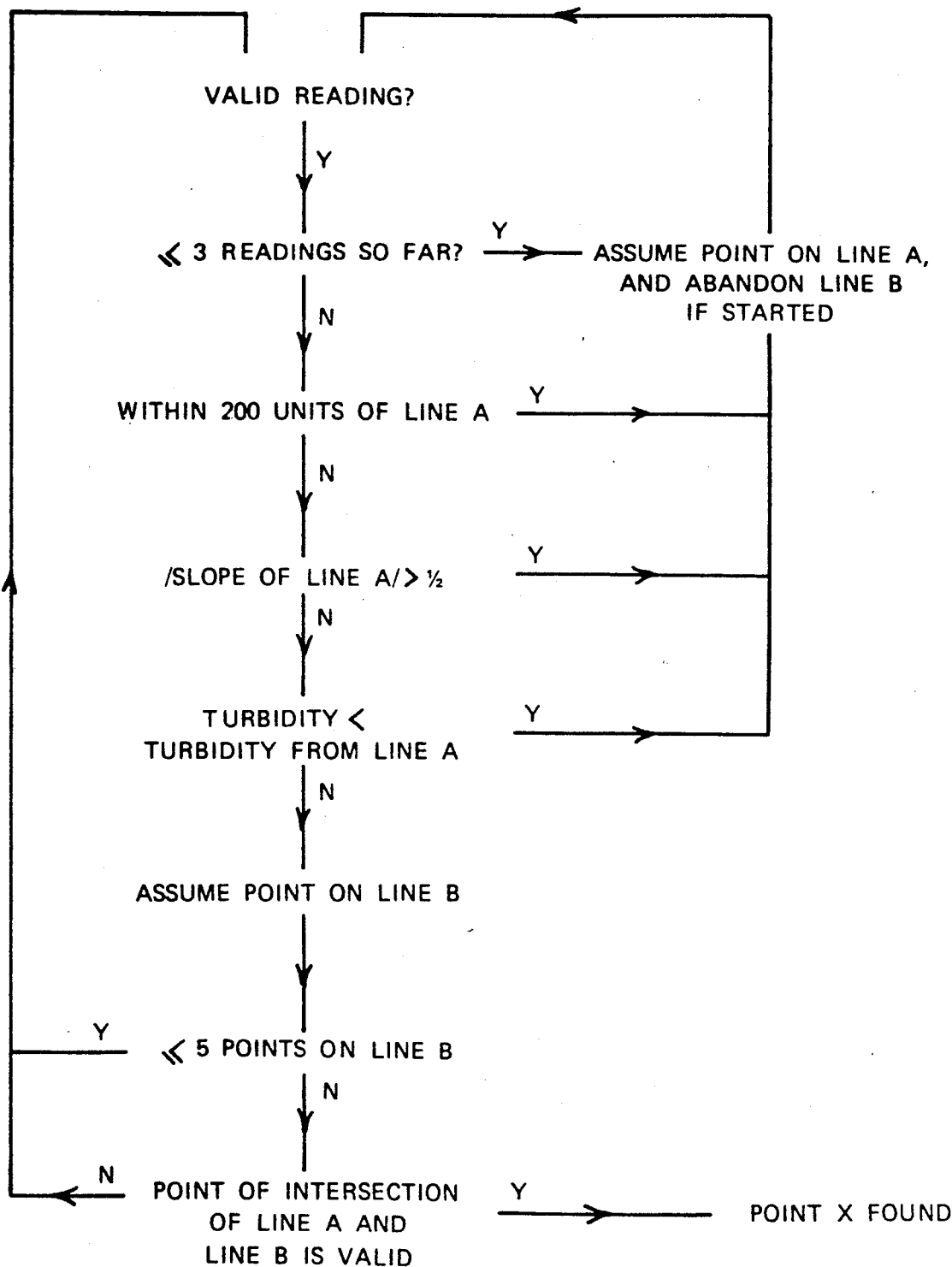
FIG. 3 shows a known algorithm.
Figure 4:
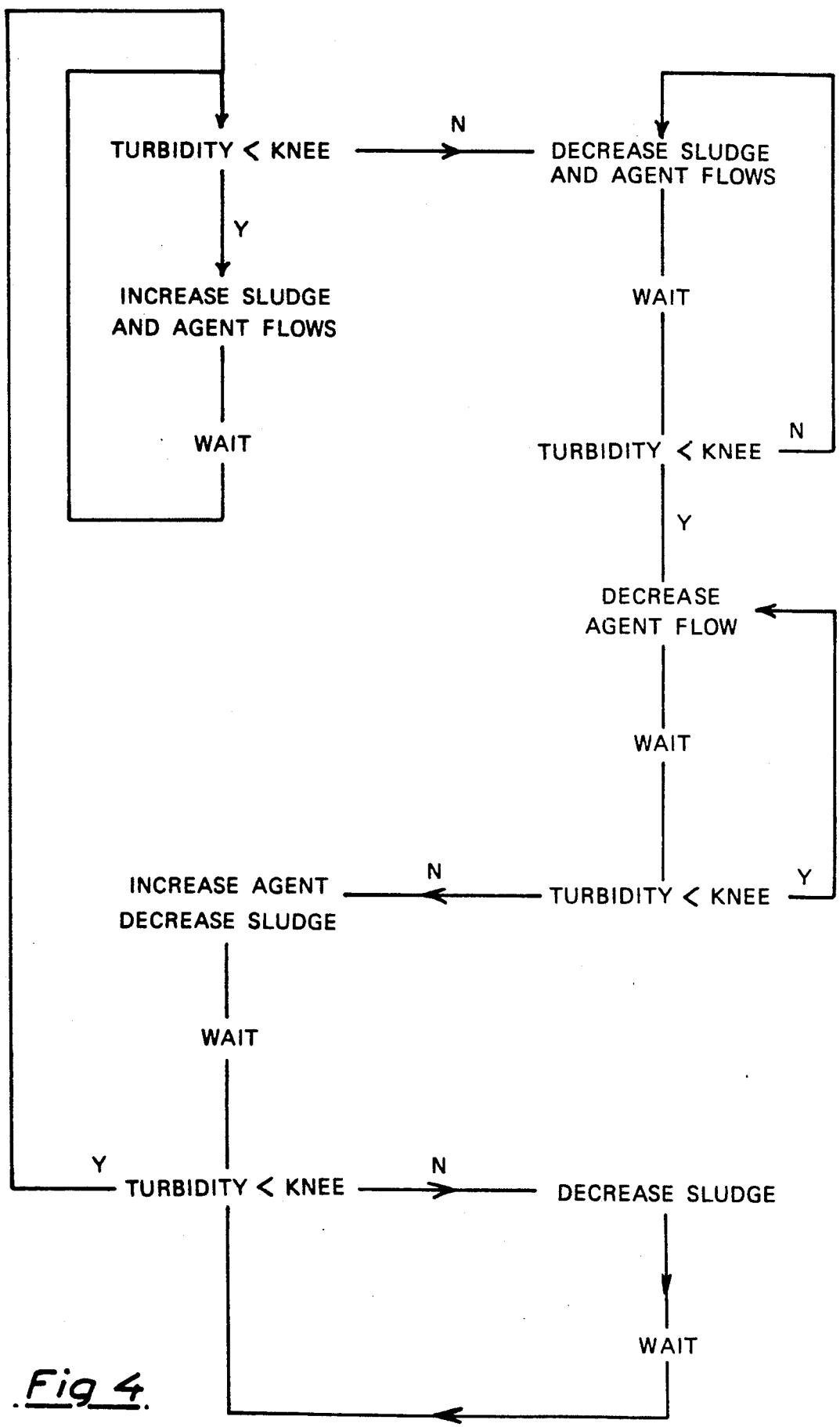
FIG. 4 and 5 show algorithms used in the method of the invention.
Figure 5:
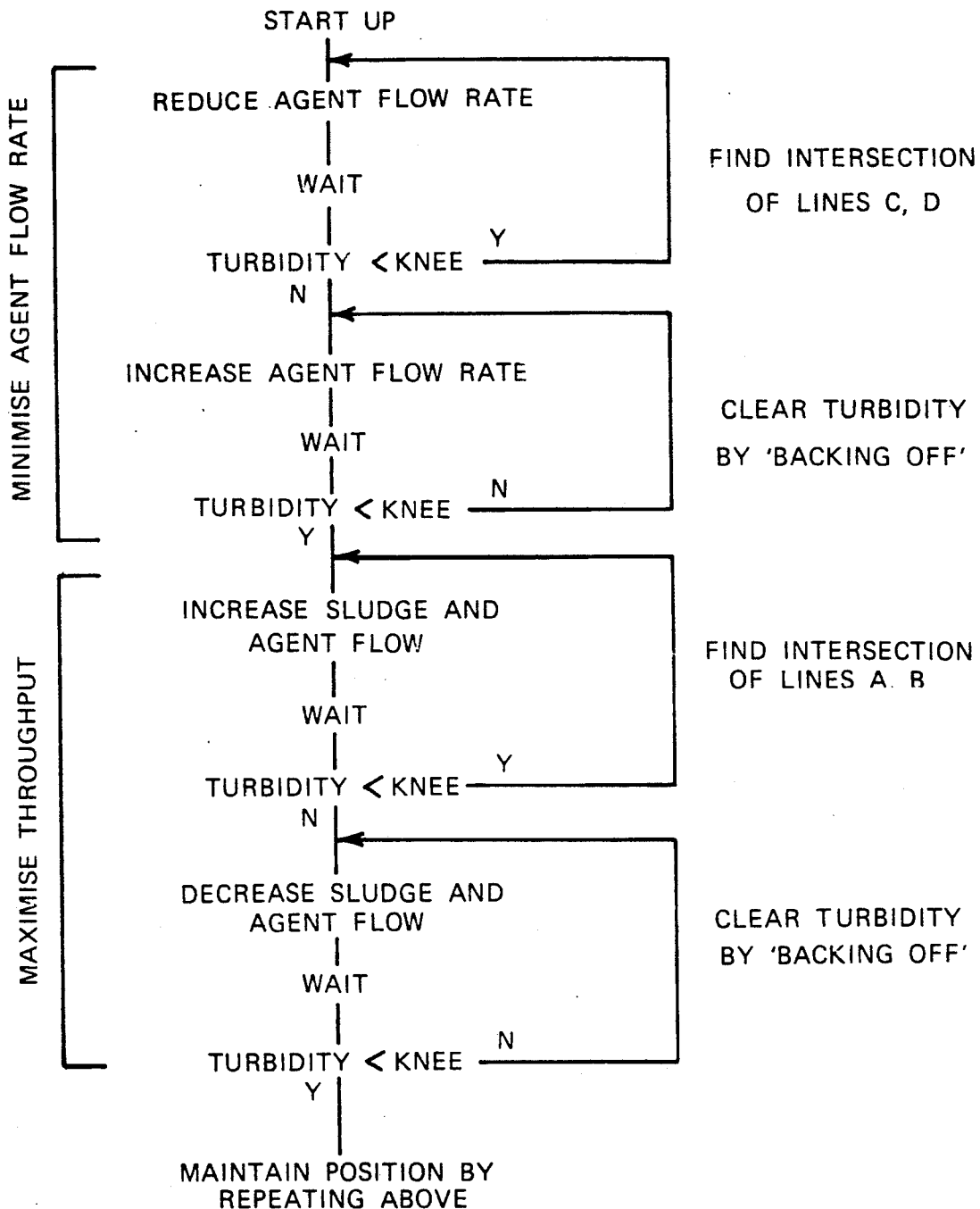

There is shown in the drawings a conventional point x or knee locating algorithm (FIG. 3) and algorithms used by the apparatus of the present invention (FIGS. 4 and 5).

In relation to the algorithm shown on FIGS. 4 and 5, two further checks are incorporated at all action points viz:
instructions are given to ensure a constant conditioning agent dose rate when finding the intersection of lines A and B (or A' and B') and to ensure a constant solids loading when finding the intersection of lines C and D; and
if the sludge flow exceeds a level consistent with the transition point x or knee, the point x is abandoned and a new point x or knee is calculated.

Some of the advantages of the apparatus and method according to the invention are:

1. For a given set of operating conditions (sludge feed characteristics, and polymer dose rate), the method and the apparatus according to the invention maximizes the throughput onto the dewatering device, because it seeks the overload or transition point ('knee'), and maintains operation at an operator-defined position relative to this point.

2. For any operating condition corresponding to a loading rate below the maximum, the polymer dose rate can be optimized. This is achieved by reducing the polymer until an increase in filtrate turbidity is detected, and then the polymer dose rate is adjusted relative to the transition point at which turbidity began to increase. The relative adjustment may be an increase or decrease, depending on the operational or economic criteria set by the operator, which in turn will be used to search the 'knowledge base' for the appropriate adjustment.

3. When the optimum loading or transition point is reached (i.e. maximum throughput for given conditions) the apparatus can again be used to further optimize the polymer dose rate, as follows:

When the maximum loading or transition point is established for a given set of conditions, the throughput can be reduced to clear the transition point. If the polymer dose rate is now changed, independent of the other operating parameters, a new transition point will be established. For example, if the quantity of polymer is decreased, a stage will be reached where the mechanical strength of the 'flocs' formed will be insufficient to prevent the (dosed) sludge from extruding sideways from the downstream end of run 11 of the belt 10. The extruded sludge passes into tray 17 (FIG. 1) or tray 34 (FIG. 2) causing an increase in reading. Likewise, an excess of polymer leads to extrusion, this time because the excess causes a deterioration in the permeability of the free-draining section of the press.

It is generally accepted that an amount of polymer somewhat in excess of that required for maximum filtrate clarity will lead to a drier sludge cake, whereas an amount corresponding to, or slightly less than, that amount for maximum clarity will lead to minimum polymer consumption.

By drawing on the knowledge base, the apparatus can define this relationship very closely. The operator need only determine whether minimum polymer consumption, or maximum sludge cake solids, is the ruling operating criterion. The apparatus will make the appropriate adjustments to the polymer dose rate.

The apparatus and method according to the invention permits simultaneous optimization of the four main objectives listed in the preamble of the present Specification.

The present invention and claims are directed to a method and an apparatus for extracting liquid from a sludge, but it will be appreciated that the invention and claims are deemed to include the separation of solids from liquid suspensions.

An overload condition may be defined as a state wherein the percentage of the incoming sludge stream which is lost to the resulting liquid is in excess of that which would be acceptable, in economical or process terms, for extended operating periods.

Figure 8:
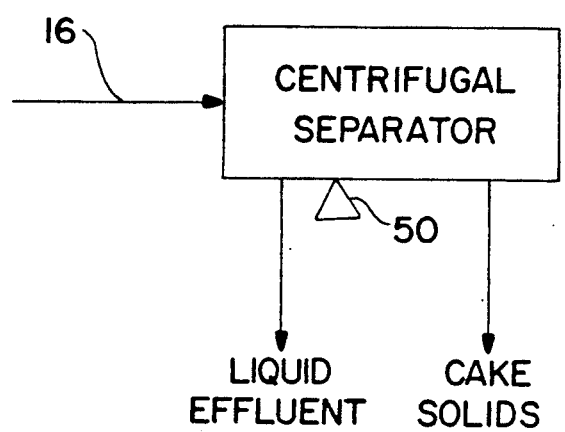
FIG. 8 shows the invention utilized with a centrifugal separator.

It will be appreciated that a centrifugal separation means may be used instead of a filtration means, as illustrated in FIG. 8. In that event, when an overload condition occurs, the overspillage is discharged directly into the centrate (or filtrate) and the monitoring means would monitor the turbidity or solids content of the centrate.

The invention is not limited by or to the specific embodiments described which can undergo considerable variation without departing from the scope of the invention.

I claim:

1. A method for extracting liquid from a sludge which method comprises the steps of
feeding a conditioning agent to the sludge to form a mixture;
feeding the mixture to a separator means for enabling a significant proportion of the liquid, known as the resulting liquid, to be removed therefrom;
continuously or substantially continuously measuring a characteristic of the resulting liquid so as to produce a first input signal;
continuously or substantially continuously monitoring and analyzing the first input signal in an analyzer means so as to determine a first empirical rate of change of the characteristic;
outputting from the analyzer means a first output signal related to the first input signal which first output signal serves to control the rate of flow of the mixture through the separator means;
creating an overload condition wherein the mixture flows from the separator means into the resulting liquid thereby producing contaminated liquid;

continuously or substantially continuously monitoring the characteristic of the contaminated liquid so as to produce a second input signal;

continuously or substantially continuously monitoring and analyzing the second input signal in the analyzer means so as to determine a second empirical rate of change of the characteristic;

determining a transition point between the first rate of change and the second rate of change; which transition point is the upper limit of said first rate of change; and subsequently maintaining the flow of the mixture so that the value of the characteristic is maintained near but not at said upper limit.

2. A method as claimed in claim 1 wherein the value of the characteristic is maintained at about 90% of said upper limit.

3. A method as claimed in claim 1 wherein the value of the characteristic is maintained at between 85% and 95% of said upper limit.

4. A method as claimed in claim 1 wherein the overload condition is created by increasing the volume of mixture to the separator means.

5. A method as claimed in claim 1 wherein the overload condition is created by altering the ratio of conditioning agent to sludge.

6. A method as claimed in claim 1 wherein the characteristic is turbidity.

7. A method as claimed in claim 1 wherein the characteristic is the proportion of solid material in the resulting liquid.

8. A method as claimed in claim 1 wherein the characteristic is measured by a UV, a visible or an IR light absorbing device.

9. A method as claimed in claim 1 wherein the characteristic is measured by an ultrasonic or a nuclear-density meter.

10. A method as claimed in claim 1 wherein the separation means is a filtration means.

11. A method as claimed in claim 1 wherein the separation means is centrifugal means.

12. An apparatus for extracting liquid from a sludge which apparatus comprises means for adding a conditioning agent to the sludge to form a mixture; means for feeding the mixture to a filtration apparatus for enabling a significant proportion of the liquid, known as the resulting liquid, to be removed therefrom; means for collecting or disposing of the resulting liquid; means for collecting or disposing of the resulting de-watered mixture; means for continuously or substantially continuously measuring a characteristic of the resulting liquid so as to produce a first input signal; means for creating an overload condition wherein the mixture flows from the filtration apparatus into the resulting liquid thereby producing contaminated liquid; means for continuously or substantially continuously monitoring the characteristic of the contaminated liquid so as to produce a second input signal; analyzer means for continuously or substantially continuously monitoring and analyzing the first and second input signals so as to determine a first and a second empirical rate of change of said characteristics; said analyzer means including means for determining a transition point between the first rate of change and the second rate of change, which transition point is the upper limit of said first rate of change; and means for maintaining the flow of the mixture so that the value of the characteristic is maintained near but not at said upper limit.

13. An apparatus for extracting liquid from a sludge which apparatus comprises a first endless belt of filter material; a second endless belt of filter material; means for feeding a mixture of sludge and a conditioning agent onto the first endless belt; a first set of roller means; the first endless belt being mounted on the first set of roller means which define a path of travel for the first belt; the first belt having an upper run which, in use, is at least approximately horizontal and which has an exposed surface defining a gravity de-watering zone; the second endless belt being disposed substantially below the first belt; a second set of roller means; the second endless belt being mounted on the second set of roller means which define a path of travel for the second endless belt; some of the rollers of the first set of rollers and some of the rollers of the second set of rollers each being one and the same and define a common set of rollers whereby the first belt and the second belt travel along a common path around the common set of rollers being biased together by belt tension forces to define a pressure de-watering zone; said gravity de-watering zone being upstream of said pressure de-watering zone; a first means for collecting filtrate from the gravity de-watering zone; a second means for collecting extruded liquid from the pressure de-watering zone; means for continuously or substantially continuously monitoring a characteristic of the filtrate so as to produce a first input signal; means for continuously or substantially continuously monitoring a characteristic of the extruded liquid so as to produce a second input signal; analyzer means for continuously or substantially continuously monitoring and analyzing said first and second input signals so as to determine respective first and second empirical rates of change of the characteristic; said analyzer means including means for determining a transition point between the first rate of change and the second rate of change, which transition point is the upper limit of said first rate of change; and means for maintaining the flow of the mixture so that the value of the characteristic is maintained near but not at said upper limit.

* * * * *

UNITED STATES PATENT AND TRADEMARK OFFICE
CERTIFICATE OF CORRECTION

PATENT NO. : 5,021,166
DATED : June 4, 1991
INVENTOR(S) : Patrick TORPEY

It is certified that error appears in the above-identified patent and that said Letters Patent is hereby corrected as shown below:

On title page item (30) Foreign Application Priority Data, change "United Kingdom" to --Ireland--.

Signed and Sealed this

First Day of December, 1992

Attest:

DOUGLAS B. COMER

Attesting Officer

Acting Commissioner of Patents and Trademarks